United States Patent
Stavarache et al.

(10) Patent No.: US 11,636,417 B2
(45) Date of Patent: Apr. 25, 2023

(54) COGNITIVE ANALYSIS FOR ENTERPRISE DECISION META MODEL

(71) Applicant: INTERNATIONAL BUSINESS MACHINES CORPORATION, Armonk, NY (US)

(72) Inventors: Lucia Larise Stavarache, Columbus, OH (US); Stan Kevin Daley, Atlanta, GA (US); Harish Bharti, Pune (IN); Rajesh Kumar Saxena, Maharashtra (IN); Mukundan Sundararajan, Bangalore (IN); Sandeep Sukhija, Rajasthan (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 17/125,640

(22) Filed: Dec. 17, 2020

(65) Prior Publication Data
US 2022/0198350 A1 Jun. 23, 2022

(51) Int. Cl.
*G06Q 10/06* (2012.01)
*G06Q 40/02* (2012.01)
(Continued)

(52) U.S. Cl.
CPC ..... *G06Q 10/0637* (2013.01); *G06F 16/9024* (2019.01); *G06Q 40/02* (2013.01)

(58) Field of Classification Search
CPC . G06Q 10/0637; G06Q 40/02; G06F 16/9024
See application file for complete search history.

(56) References Cited

U.S. PATENT DOCUMENTS

| | | | |
|---|---|---|---|
| 6,721,713 B1 * | 4/2004 | Guheen | G06Q 50/01 715/202 |
| 6,957,186 B1 * | 10/2005 | Guheen | G06Q 90/20 705/323 |

(Continued)

FOREIGN PATENT DOCUMENTS

CN 108764726 A * 11/2018 ........... G06K 9/6215

OTHER PUBLICATIONS

Li et al. "A Nearly Optimal All-Pairs Min-Cuts Algorithm in Simple Graphs" (2021) (https://arxiv.org/pdf/2106.02233.pdf) (Year: 2021).*

(Continued)

*Primary Examiner* — Sujay Koneru
(74) *Attorney, Agent, or Firm* — Tutunjian & Bitetto, P.C.; Michael A. Petrocelli

(57) ABSTRACT

A computer implemented method is provided that includes creating an industry force graph meta model; and establishing a relationship for each maturity dimension to determine most relevant content. The most relevant content is graphed using a chromatic polynomial to map strongest industry trends in an industry force. The method continues with building traversal logic to determine most relevant technologies for the strongest industry trends in the industry force. Most relevant components of an component business model are identified, and linkages between the strongest industry trends in the industry force are made to the most relevant components of the component business model.

17 Claims, 12 Drawing Sheets

(51) Int. Cl.
  *G06F 16/901* (2019.01)
  *G06Q 10/0637* (2023.01)

(56) References Cited

U.S. PATENT DOCUMENTS

| | | | | |
|---|---|---|---|---|
| 8,121,874 | B1* | 2/2012 | Guheen | G06Q 10/087 |
| | | | | 705/28 |
| 9,910,899 | B1* | 3/2018 | Fields | G06Q 10/10 |
| 10,592,828 | B2 | 3/2020 | Farooq et al. | |
| 11,275,894 | B2* | 3/2022 | Ankisettipalli | G06N 5/022 |
| 2006/0004595 | A1* | 1/2006 | Rowland | G06Q 10/06 |
| | | | | 705/1.1 |
| 2006/0143081 | A1* | 6/2006 | Argaiz | G06Q 30/02 |
| | | | | 705/14.1 |
| 2007/0027701 | A1* | 2/2007 | Cohn | G06Q 10/0637 |
| | | | | 705/7.36 |
| 2007/0279416 | A1* | 12/2007 | Cobb | G06T 11/206 |
| | | | | 345/440 |
| 2008/0140472 | A1* | 6/2008 | Gilat | G06Q 10/00 |
| 2008/0195453 | A1* | 8/2008 | Smith | G06Q 10/00 |
| | | | | 705/7.12 |
| 2010/0107135 | A1* | 4/2010 | Arsanjani | G06Q 10/067 |
| | | | | 717/137 |
| 2011/0234594 | A1* | 9/2011 | Charles | G06K 9/6224 |
| | | | | 345/440 |
| 2012/0124104 | A1* | 5/2012 | Bhandari | G06Q 30/0201 |
| | | | | 707/812 |
| 2012/0231829 | A1* | 9/2012 | Guo | H04W 72/04 |
| | | | | 455/509 |
| 2013/0212474 | A1* | 8/2013 | McCahon | G06F 40/166 |
| | | | | 715/256 |
| 2014/0019198 | A1* | 1/2014 | Lyras | G06F 16/00 |
| | | | | 705/7.28 |
| 2015/0100386 | A1* | 4/2015 | Lambert | G06Q 10/0637 |
| | | | | 705/7.36 |
| 2015/0317580 | A1* | 11/2015 | Glissmann-Hochstein | |
| | | | | G06Q 10/0639 |
| | | | | 705/7.38 |
| 2017/0293874 | A1* | 10/2017 | Asaf | G06N 3/0436 |
| 2019/0042632 | A1* | 2/2019 | Krause | G06F 16/248 |
| 2019/0355483 | A1* | 11/2019 | Smurro | G06N 3/0445 |
| 2020/0057976 | A1* | 2/2020 | Prakash | G06Q 10/0633 |
| 2020/0286016 | A1* | 9/2020 | Singh | G06N 20/00 |
| 2020/0313849 | A1* | 10/2020 | Kar | H04L 9/0819 |
| 2021/0149384 | A1* | 5/2021 | Dittmer | G06F 11/3037 |
| 2021/0334713 | A1* | 10/2021 | Edgar | G06N 3/02 |

OTHER PUBLICATIONS

Mell et al., "The NIST Definition of Cloud Computing", National Institute of Standards and Technology, Special Publication 800-145, Sep. 2011, pp. 1-7.

Shivade, et al., "Method for Continuous Generation of Component Business Model Heat Map using Execution Data for a Complex Service Enterprise", Proceedings—6th IEEE International Symposium on Service-Oriented System Engineering, SOSE 2011., Dec. 2011, pp. 241-250.

Mattyasovszky-Philipp, et al., "Cognitive Enterprise and Cognitive Information Systems", Jul. 6, 2018, pp. 64-67.

Anonymous., "Component business models, Making specialization real", IBM Global Business Services, IBM Institute for Business Value, Component business models, 2020, pp. 1-16.

Niemoller, et al., "Cognitive technologies in network and business automation", Ericsson Technology Review, Jun. 28, 2018, pp. 1-13.

Huang, et al., "Data-driven Analytics for Business ArchitectureszProposed Use of Graph Theory", dataarXiv: 1806. 03168v1 [cs.SE], Jun. 5, 2018, pp. 1-6.

* cited by examiner

| SECTION | TECHNOLOGY TREND | TECHNOLOGY CATEGORY | | | |
|---|---|---|---|---|---|
| | | k1 | k2 | k3 | kn |
| Section 1 | Technology Trend 1 | Yes | No | No | ... |
| Section 2 | Technology Trend 2 | No | Yes | Yes | ... |
| Section i | Technology Trend 3 | ... | ... | ... | ... |

FIG. 7

Sales and Service 58a

| Advisory | Sales Management | Customer Management | Agreement Management | Collections & Default Mgmt |
| --- | --- | --- | --- | --- |
| Marketing | Channel Management | Customer Reporting & Analytics | Customer Exp. Delivery mgmt | Customer service management |

Customer Offer Development 58b

| Offer Portfolio mgmt | Customer Experience Design | Product mgmt | Pricing mgmt | Innovation and Experiment |

Product Specific Design & Processing 58c

| Loans & deposit | Cards | Pensions | Wholesale trading | Trade Banking |
| --- | --- | --- | --- | --- |
| Consumer services | Investment mgmt | Life Insurance | Market Operations | Corporate Finance |

Cross Product Design & Processing 58d

| Payments | Account mgmt | Risk Limits and mgmt | Pricing Billing & Charging |
| --- | --- | --- | --- |
| Liquidity mgmt | Loyalty | Commissions | Access Instruments |

Business Support 58e

| Brand | Strategy & Business Direction | Business mgmt & control | Human resources | IT mgmt |
| --- | --- | --- | --- | --- |
| Finance mgmt | Building & Equipment mgmt | Corp. Relationships | Document Management Operations | Enterprise Services |

Data Management 58f

| Customer & Involved Party | Product |
| --- | --- |
| Agreements | Others |

Risk and Compliance Management 58g

| Customer & Involved Party | Product |
| --- | --- |
| Agreements | Others |

COGNITIVE ANALYSIS FOR ENTERPRISE DECISION META MODEL

BACKGROUND

The present invention generally relates to modeling, and more particularly to the components within an Enterprise Component Model (ECM) that can be matured to help achieve business aims and goals.

Component Business Modeling (CBM) is a technique to model and analyze an enterprise. It is a logical representation or map of business components or "building blocks" and can be depicted on a single page. It can be used to analyze the alignment of enterprise strategy with the organization's capabilities and investments, identify redundant or overlapping business capabilities, analyze sourcing options for the different components (buy or build), prioritizing transformation options and can be used to create a unified roadmap after mergers or acquisitions.

The model is organized as business components along columns and "operational levels" along rows. The business components are defined partly as large business areas with characteristic skills, IT capabilities and process.

SUMMARY

In accordance with an embodiment of the present invention, a computer implemented method for providing enterprise decision making from a meta model is described that includes creating an industry force graph meta model; and establishing a relationship for each maturity dimension to determine most relevant content. The most relevant content is graphed using a chromatic polynomial to map strongest industry trends in an industry force. The method continues with building traversal logic to determine most relevant technologies for the strongest industry trends in the industry force. Most relevant components of an component business model are identified, and linkages between the strongest industry trends in the industry force are made to the most relevant components of the component business model. The linkage provides data on maturity of client performance in an industry force.

In another embodiment of the present disclosure, a system for providing enterprise decision making from a meta model is provided that includes a modeler for creating an industry force graph meta model for a client; and a maturity calculator establishing a relationship for each maturity dimension in the industry force graph metal model to determine most relevant content. The system further includes an industry trend evaluator for graphing the most relevant content using a chromatic polynomial to map strongest industry trends in an industry force; and a logic engine for building traversal logic to determine most relevant technologies for the strongest industry trends in the industry force. The system for providing enterprise decision further includes a component business model evaluator for identifying most relevant components of an component business model; and a linkage generator for creating linkages between the strongest industry trends in the industry force to the most relevant components of the component business model. The linkages provide data on maturity of client performance in an industry force.

In another embodiment, a computer program product is described for providing enterprise decision making from a meta model comprising a computer readable storage medium having computer readable program code embodied therewith. The program instructions executable by a processor to cause the processor to create an industry force graph meta model for a client. The computer instructions also establish, using the processor, a relationship for each maturity dimension to determine most relevant content. The computer instructions further graph, using the processor, most relevant content using a chromatic polynomial to map strongest industry trends in an industry force. The computer instructions can also include to build, using the processor, traversal logic to determine most relevant technologies for the strongest industry trends in the industry force; and to identify, using the processor, most relevant components of an component business model. In some embodiments, the method executed by the computer instructions can create, using the processor, linkages between the strongest industry trends in the industry force to the most relevant components of the component business model. The linkages provide data on client performance in an industry force.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 7 includes a table of the section technology trend-k mapping.

FIG. 8 is a table illustrating the elements of a component business model (CBM) in accordance with one embodiment of the present disclosure.

DETAILED DESCRIPTION

Figure 1:
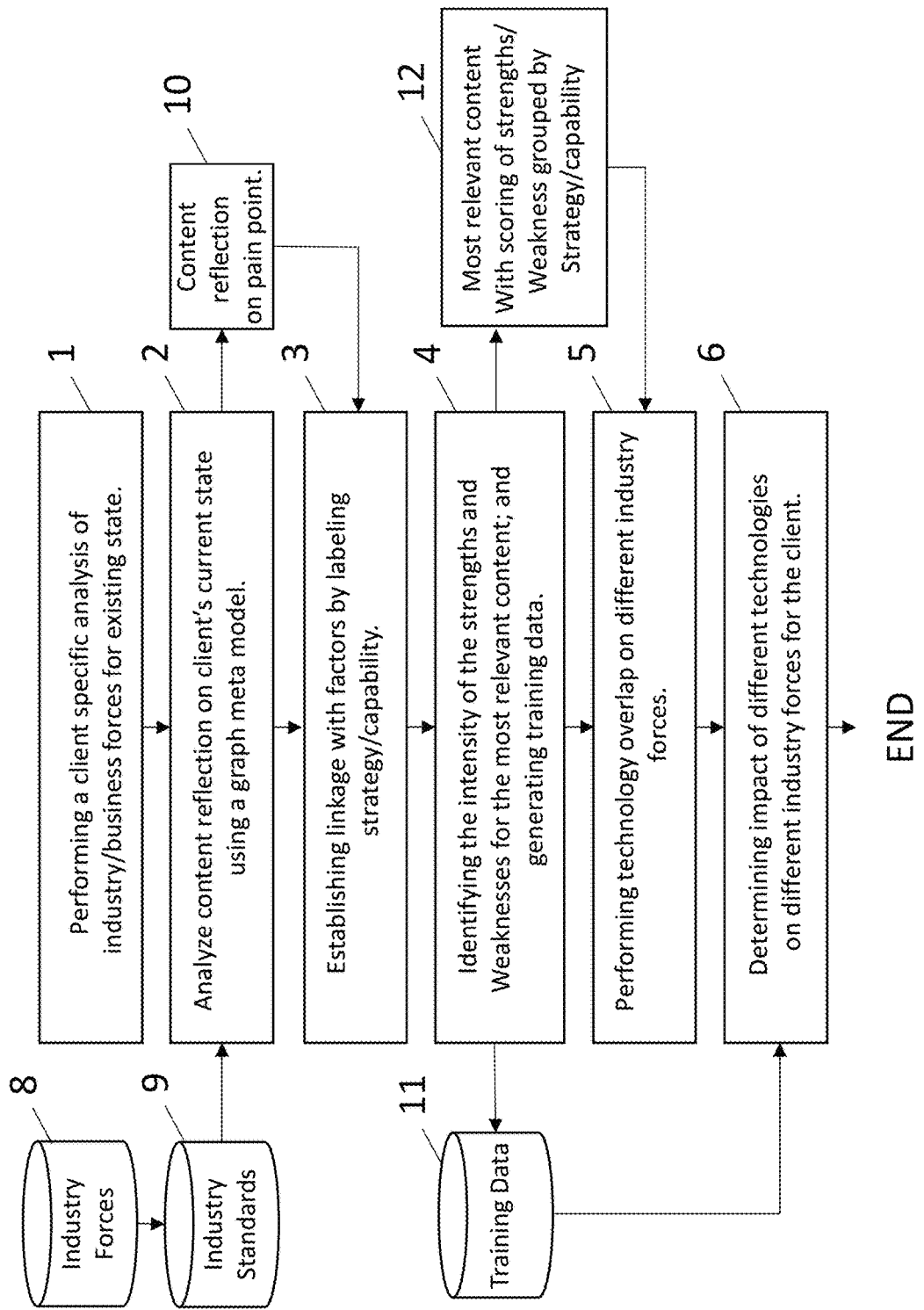
FIG. 1 is a block/flow diagram illustrating a method of generating a cognitive enterprise decision meta model, in accordance with one embodiment of the present disclosure.

Component Business Modeling (CBM) is a method for Enterprise Component Modelling. The current methodology is static in execution and does not contain intelligence propagated from all engagements that can lead to a best recommendation for future client's engagements. A homogenous arbiter is not available that can analyze the input, output and providers to better help identify problems, helping to address and eliminate consultant bias that may be introduced by people in the field that tend to be patterned to a problem based on their experience versus market's goals. It has currently been determined that under existing methods, client advice tends to be repetitive and is directed at solving known problems instead of gaining insights and attaining value.

In view of the above, the methods, systems and computer program products helps a practitioner to identify, in an objective, consistent, and repeatable way, the components within an Enterprise Component Model (ECM) that should be matured to help achieve a client's top Business Aims and Goals and, once identified, to create a roadmap that defines the order in which the components should be matured and leverage past engagements by transferring the learning into the core model.

The methods, systems and computer programs of the present disclosure provide a least one of the following:

1) Continuous Enterprise Component modeling decisions;
2) Auditable decisions aligned with market, industry and business evolution;
3) Ability to do safe-simulations of scenarios and transfer use-case earnings from similar clients or industries;
4) Timeseries traceability and historical evolution analysis;
5) Federated meta-model creation with learning embeddings;
6) Business decision/strategy can be explained and monitored, switching the parading from robust to resilient and anti-fragile;
7) Transforms a natural client conversation and pain points into the CBM capabilities matrix and subsequently in the assessment models; and
8) Method and approach to interlock multiple Industry templates through client conversation needs and transfer learnings into one federated model as Business of IT or Business or Strategy.

In some embodiments, the present disclosure provides a method and framework for artificial intelligence (AI) infused assessment of industry forces and its mapping to an industry capability model, taking the technological perspective on industry component business model (CBM). A dynamic analysis may be performed based on Industry force content reflection considering Industry Standard models, such as business capability models, e.g., CBM models.

Exemplary applications/uses to which some embodiments of the present invention can be applied include, but are not limited to, clients (users) undergoing transformation of their business and in the adoption of core threads, such as transition of native applications to cloud based services and the incorporation of artificial intelligence (AI) into business operations. The cognitive enterprise decision meta model is applicable to clients wanting to optimize their hosting cost, automate areas of business, and open new areas or business with the help of artificial intelligence (AI).

The method, systems and computer program products of the present disclosure are now described in greater detail with reference to FIGS. 1-12.

Figure 2:
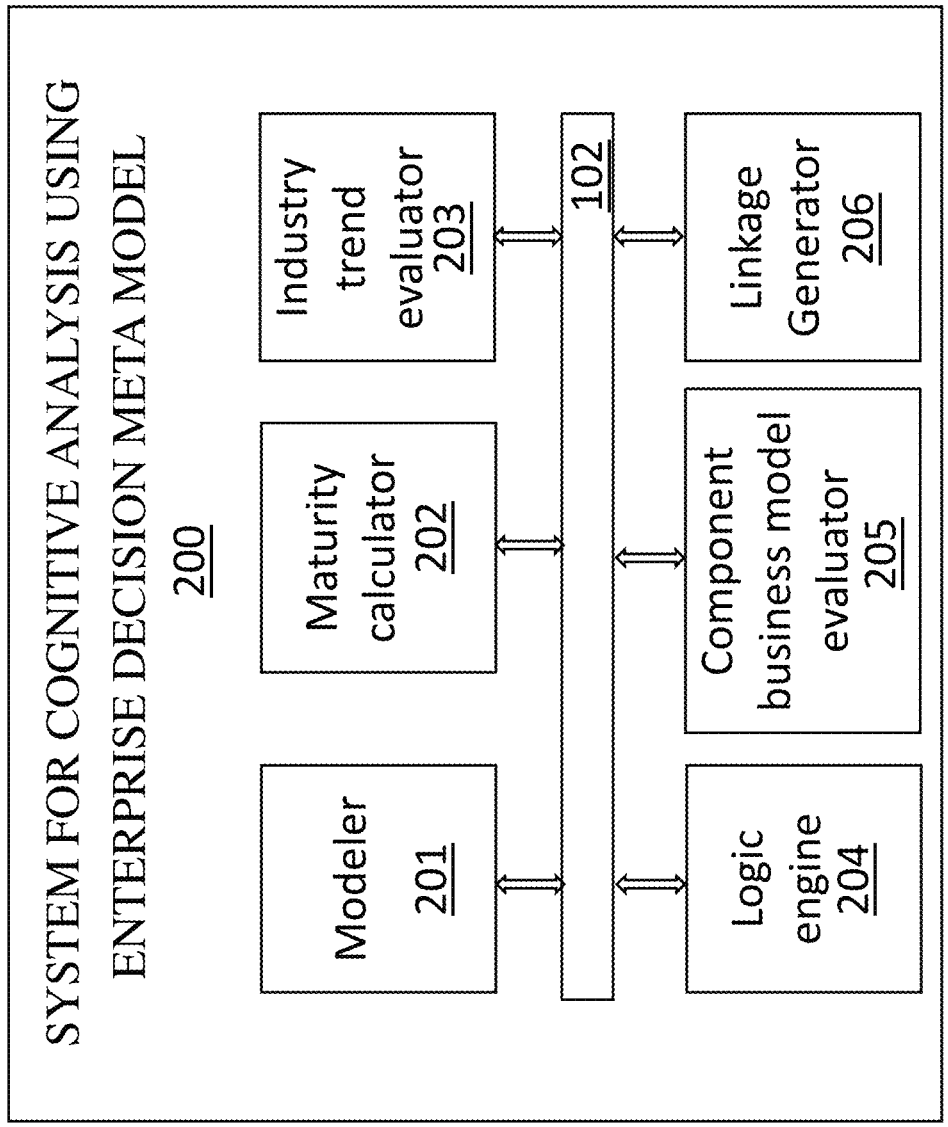
FIG. 2 is a block/flow diagram illustrating a system for system for cognitive analysis for enterprise decisions using a meta model, in accordance with one embodiment of the present disclosure.

FIG. 1 illustrates one embodiment of a method of generating a cognitive enterprise decision meta model. FIG. 2 depicts one embodiment of system 200 for cognitive analysis for enterprise decisions using a meta model.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Figure 3:
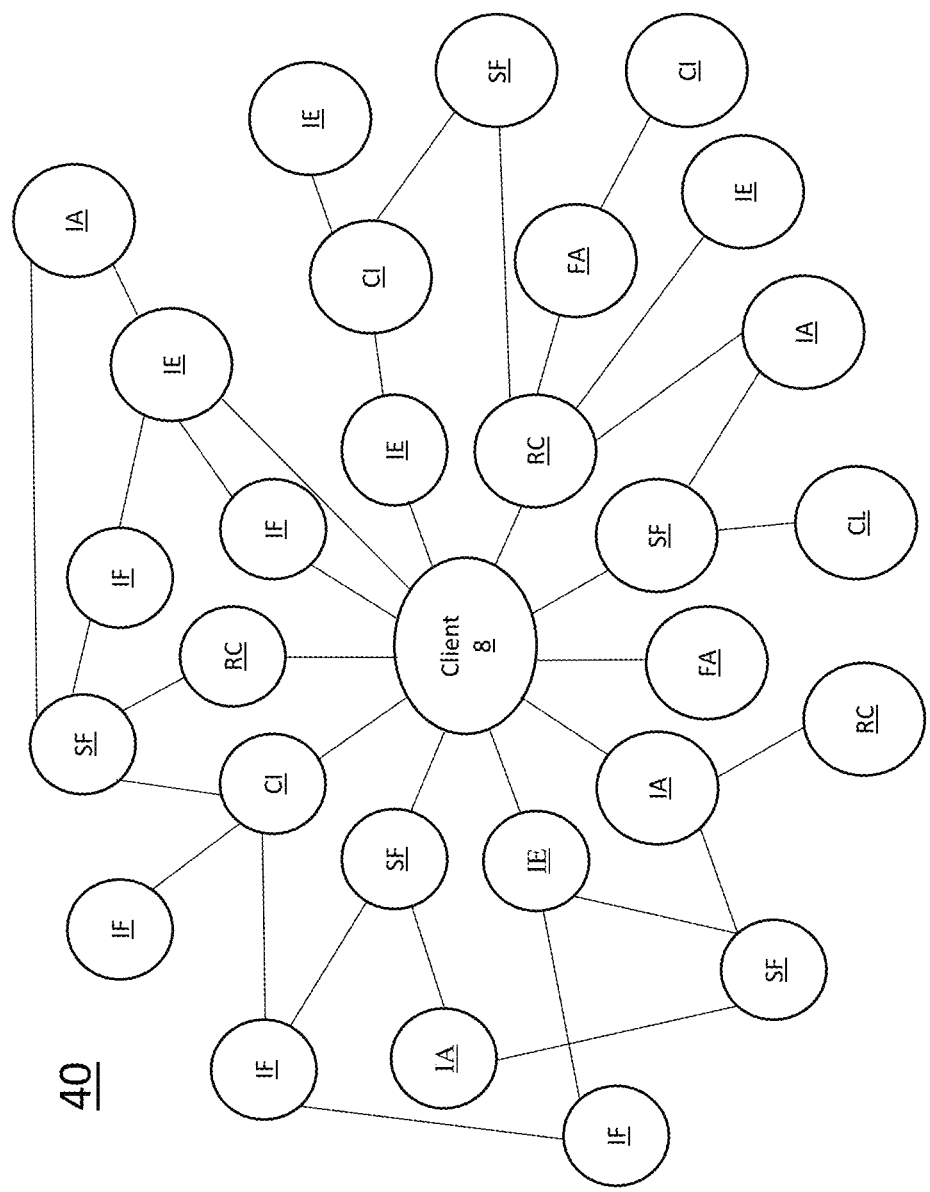
FIG. 3 is a graphical representation of a meta model illustrating connectivity parity, in accordance with one embodiment of the present disclosure.

Referring to blocks 1 and 2 of the computer implemented method depicted in FIG. 1, an industry force graph meta model is generated, depicting at least one diverse set of most relevant content reflecting a client's current state on an industry force, such as Digital Banking. In some embodiments, generating the force graph meta model includes establishing graph min-cut and connectivity parity. The graph min-cut is the maximum number of connections a single node can have signifying maximum linkages technology can have, determining the quality. The framework can mine the data available and rate it to identify how optimal the research is. In some embodiments of the present disclosure, this step of the method may be provided by the modeler 201 for the system for cognitive analysis for enterprise decisions using a meta model 200 that is depicted in FIG. 2. FIG. 3 is one embodiment of a graphical representation of a meta model illustrating connectivity parity.

The industry/business force is a core fundamental segment, e.g., cloud, blockchain, and/or digitization etc., that is disruptive and represent the goal of the client suite for modernizing their business. Top disruptive industry forces can be analyzed for AS IS Maturity. FIG. 1 illustrates one embodiment of a method for analyzing an industry force for AS-IS maturity beginning at block 1. Block 1 includes performing a client specific analysis of industry/business forces for an existing state, e.g., AS-IS maturity. This may be a client specific analysis. Referring to FIG. 1, in some embodiments, the label features for industry forces can include pain points, business drivers, business models, business benefits, key performance indicators (KPIs), measures, standards, guidelines, processes, metrics, assets and combinations thereof.

The maturity dimensions for the industry/business force may be quantitative, qualitative or a combination thereof.

In some embodiments in determining the AS-IS maturity of a industry/business force, heat maps for the industry force may be employed that corroborate insights from industry templates, such as insurance, insurance for retail and insurance for banking, etc. The maturity dimensions for industry force may be quantitative & qualitative. Heatmaps can also be employed for corroborating insights from industry templates, e.g., insurance, insurance for retail, and/or insurance for banking. Intelligent workflows for industry force can link the multiple components, assets, processes and metrics with attributes as automation or artificial intelligence embedded, linking the AS-IS, maturity assessments and heatmaps to business processes.

Referring to FIG. 3, for the graphical representation of the meta model 40 illustrating connectivity parity the type of content being represented can include: research content (RC), industry forum (IF), social media (SF), clients internal forum (CI), financial analyst content (FA), industry analyst (IA) content, industry events (IE), external publication and success stories.

The initial output is calculated for each dimension, and strengths and weaknesses are identified. The initial output is then linked to Component Business Model (CBM) components, which can include creating linkage of each industry force insight to CBM to get a prioritized roadmap. Prior operating models are based on interviewing people. The operating model of the present disclosure will execute this step before the start of interviews. In this example, before working with the customer to do data collection, the methods of the present disclosure perform and internal data collection based on data provided by client. From the internal data collection, the methods, systems and computer program products can then extend the same pinpoints and context in the model to look for the external content.

The solution that is provided by the methods, systems and computer program products of the present disclosure takes the technological perspective on industry CBM. The solution can perform dynamic analysis based on industry force content reflection considering industry standards, such as industry CBM Models. The solution can also perform the content reflection based on different configurable categories, such as Research Content (RC), Industry Forum (IF), Social Media (SF), Clients Internal Forum (CI), Financial Analyst Content (FA), Industry Analyst Content (IA), Industry Event (IE), External Publications and combinations thereof.

The solution that is provided by the methods, systems and computer program products of the present disclosure has the capability to perform the analysis on the basis of dynamic linkage to case studies, such as success stories, current events and disruptors.

The methods, systems and computer program products of the present disclosure can analyze evolution over time with snapshots every quarter. A determination can be made of how the market is changing. As a Cognitive Enterprise it has to be agile and this is an enabler to react quickly.

Referring to FIG. 1, the method is client specific at block 1. As illustrated in block 1 of FIG. 1, the client specific mode can consider the client pain points for the client, which can include research content, industry forum, social media, client internal forum, financial analyst content, industry event and external publications. In some embodiments, using the client specific pain points from block 1, and taking into account the industry force from block 8, e.g., cloud, digital banking, blockchain, and the industry standards from block 9, the method may analyze content reflection on a client's current state using a graph meta model at block 2. The method may continue to content reflection on pain point at block 10. At block 3, the method further provides for establishing linkage with important factors by labeling with strategy/capability. Referring to block 3, the method can continue by identifying the intensity of the strengths and weaknesses for the most relevant and related content. Block 4 may further include generating the data training (training data is depicted in block 11) by using scores of multiple clients. At block 12, the method may continue with considering the most relevant content with scoring of strengths and weakness grouped by strategy/capability.

Referring to block 5, in some embodiments, the method may include performing technology overlap on different industry forces. At block 6, the method continues with determining the impact of different technologies on various industry forces for the client.

Figure 4:
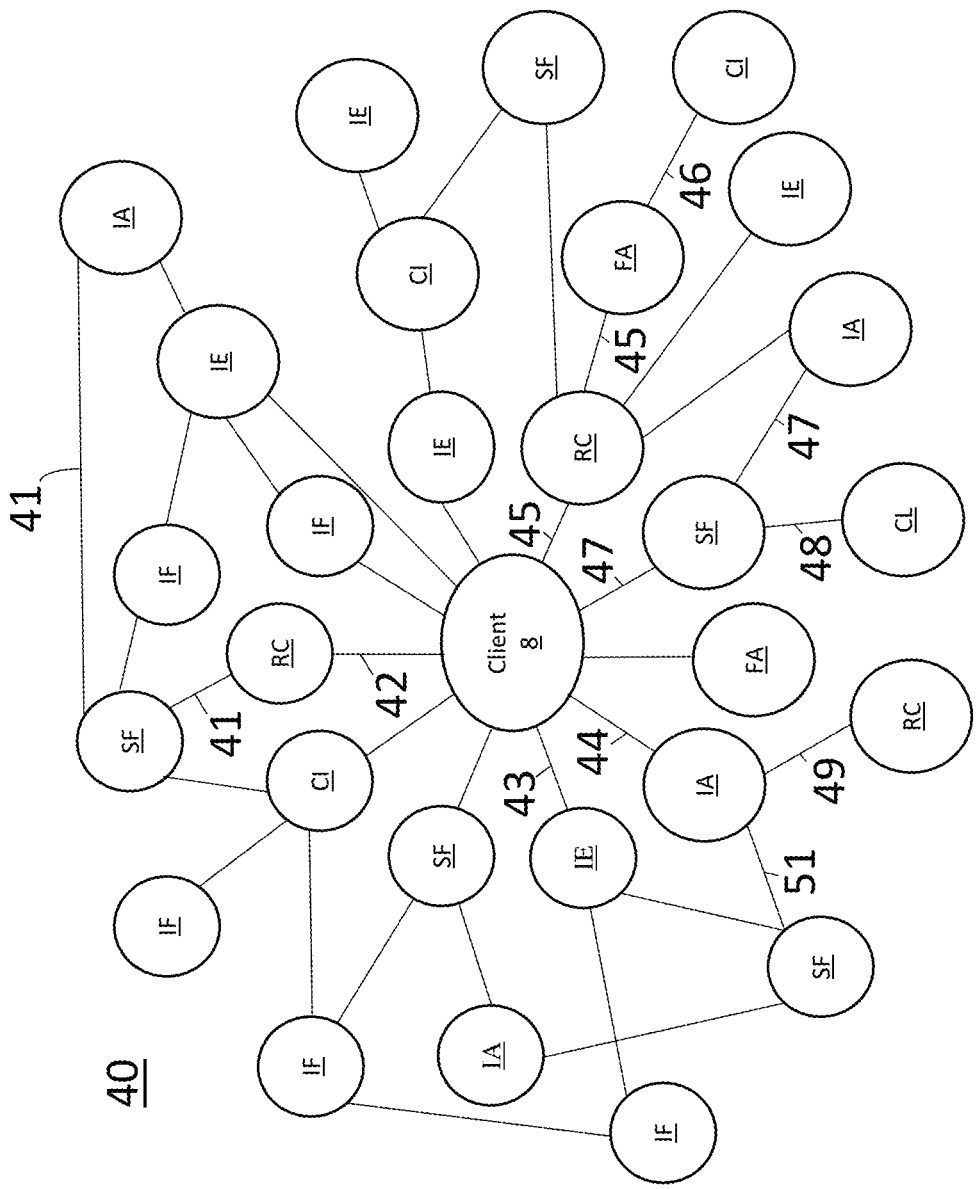
FIG. 4 is a graphical representation of a meta model illustrating labeling of capability/strategy, in accordance with one embodiment of the present disclosure

Block 1 of FIG. 1 may include a graphical model and framework. In some embodiments, the framework identifies the area of research including input's defining functionality context, then technology is organized under various components of the framework. All the information from the public and other listed data sources is curated by mining and organized into a graph, e.g., a graph database as GraphDB. The reference business, functionalities and technology are stored as nodes IF, SF, EF, IA, CI, RC, FA and the technology connects them as edges 41, 42, 43, 44, 45, 46, 47, 48, 49, 51, as depicted in the meta model illustrating connectivity parity, as depicted in FIGS. 3 and 4. Edges are technology capabilities as cognitive, AI, blockchain, Cloud and combinations thereof. These technological traverses are parameterized and can be changed by the framework.

The methods, systems and computer program products that are described herein generate a graph meta model 40, as depicted in FIG. 3, depicting a wide range of most relevant content reflecting the clients current state on industry force, such as digital banking. The first step can include building a graph, and then converting the graph into a directional at a later stage. In the context of the target client 8 and their pain points, system will consider the content from defined categories, such as research content (RC), industry forums (IF), social media (SF), clients internal forum (CI), financial analyst content (FA), industry analyst content (IA), industry event (IE), external publications (EP), success stories (SS) and combinations thereof.

When there is a longer version of a relationship, it will show on the graph meta model that it is much more relevant to this customer.

Referring to the meta model 40 illustrating connectivity parity depicted in FIG. 3, in some embodiments, the context accounts for technology from diverse sources and type of technology, e.g. Research Technology (RC), Technology Forums (IF), Social Media (SF: CI: Functionalities Internal Forum, FA: Financial Analyst Technology, IA: Technology Analyst Technology, IE: Technology Event and others) in a Graph G, according to equation (1):

$$G = (N, E, \varphi) \text{ where} \qquad \text{Equation (1)}$$

$N$ is a finite set, called the vertices of $G$, $E$ is a finite set, called the edges of $G$, and $\varphi$ is a function with domain $E$ and codomain $P2(V)$.

Then, the vertex-edge incidence matrix is a matrix of order n×e and denoted by $A(G) = [a_{ij}]$, whose n rows correspond to the n vertices and the e columns correspond to the e edges as follows, according to equation (2):

$$a_{ij} = \begin{cases} 1 & \text{if the } j^{th} \text{ edge of } e_i \text{ is incident on } i^{th} \text{ vertex of } v_i \\ 0 & \text{otherwise} \end{cases} \qquad \text{Equation (2)}$$

Thus, A(G) with m vertices and n edges can be represented as follows according to equation (3):

$$(G) = \begin{bmatrix} a_{11} a_{12} a_{13} & \dots & a_{1n} \\ a_{21} a_{22} a_{23} & \dots & a_{2n} \\ & \dots & \\ & \dots & \\ a_{m1} a_{m2} a_{m3} & \dots & a_{mn} \end{bmatrix} \quad \text{Equation (3)}$$

Generating the meta model 40 illustrating connectivity parity depicted in FIG. 3 continues with the graph min-cut and connectivity parity. The graph min-cut is the maximum number of connections a single node can have. This signifies the maximum linkages a technology can have, determining the quality. The framework mines the data available and rates it to identify how optimal is the research. The min-cut of an undirected graph is defined as the number n-c, where n is the number of vertices and c is the number of connected components of the graph. From equation (3) we can compute min-cut as (m-1). A node with high traversal will become a spot in the graph, which can be represented by creating an adjacency matrix such that, a graph G with n vertices and no parallel edges is an n×n matrix J=[Jij] whose elements are given by equation (4), as follows:

$$a_{ij} = \begin{cases} 1 & \text{if there is an edge between the } i^{th} \text{ and } j^{th} \text{ vertices} \\ 0 & \text{if there is no edge between them} \end{cases} \quad \text{Equation (4)}$$

For J, $a_n$ (i, j) gives the number of paths of the length n from $v_i$ to $v_j$ (i.e., number of different edge priorities of n edges) whenever i≠j.

Suppose $v_i$ and $v_j$ be two nodes of graph G and J be the adjacency matrix. If we define the matrix Bn as $J+J^2+J^3+\ldots+J^n$, then, from the matrix Bn we can determine the number of paths of length n or less from vi to vj (for i≠j). We define connectivity parity B, as, $$B = J + J^2 + J^3 + \ldots + J^{m-1} \quad \text{Equation (5)}$$

G is a connected graph if and only if for every pair of distinct indices i and j, we have bij≠0 i.e., B has no zero entries. From Eq (4) and Eq (5), we get the Quality index Q as follows:

$$Q = \frac{\text{Min} - \text{cut}[A(G)]}{\text{Connectivity parity}} = \frac{m-1}{B} \quad \text{Equation (6)}$$

The computer implemented methods, systems and computer program products of the present disclosure are mapping unstructured data, as depicted in FIG. 3, wherein both traversals and min-cut are evaluated.

Referring to FIG. 1, at block 3, the method may continue with establishing a linkage with an important factor by labeling 41, 42, 43, 44, 45, 46, 47, 48, 49, 51 with strategy/ capability. In some embodiments, for each maturity level, the graph for mot relevant content is identified and qualified with relationships linking wide range of content, such as by grouping by strategic/capability areas. For example, in the example depicted in FIG. 4, the strategic/capability areas may include user experience 41, mobile banking 42, system of engagement 43, digital banking 44, digital experience 47, digital portfolio 45, SoE review 51, digital consumer experience 49, top opportunities 48, and combinations thereof. In some embodiments of the present disclosure, this step of the method may be provided by the maturity calculator 202 for the system for cognitive enterprise meta modeling 200 that is depicted in FIG. 2.

Referring to FIG. 1 at block 4, the intensity of strengths and weakness is identified for the most relevant content and related content, in which training data is generated by using the scores of multiple content. In some embodiments, the method includes creating chromatic polynomials to map. The graph of most relevant and related content is further scored into strengths and weakness. Multiple clients scores will generate training labels for industry patterns and vice-versa.

In some embodiments chromatic polynomials are created to map technology categories that are pertinent with the functionality context can be viewed as parameters that are attributed to every vertex in the graph. In some embodiments of the present disclosure, this step of the method may be provided by the industry trend evaluator 203 for the system for cognitive enterprise meta modeling 200 that is depicted in FIG. 2.

In some embodiments, the maximum number of the technology category that can be used in the plotted technology which does not bring uncontrollable variation in the data. In some examples, this can be achieved by mapping technology category to various colors to G (such that no two adjacent vertices have the same color 'C'), as in Equation (7):

$$C = \{C1, C2, C3, \ldots Cn\} \quad \text{Equation (7)}$$

Any function f: V→C is called a coloring of the graph G using n colors, representing the number of technology category. The smallest number of colors to produce a proper coloring of a graph G is called the chromatic number of graph G denoted by $\chi(G)$. Thus, a graph G that requires 'k' different colors, as in Equation (8):

$$\chi(G) = k \quad \text{Equation (8)}$$

$\delta(G)$ is the minimum degree of any vertex. The degree of the graph represents how much is the given reference technology linked to other reference technologies, higher degree of graph means technology is relevant. The chromatic number is given by, equation (9):

$$\chi(G) \geq \frac{m}{(m - \delta(G))} \quad \text{Equation (9)}$$

Similarly, if $\Delta(G)$ is the largest degree of any vertex of G, then maximum colors that can be applied to the G is in Equation (10):

$$\chi(G) \leq 1 + \Delta(G) \quad \text{Equation (10)}$$

Equation (11) provides the maximum number of technology category that can be used in our current dataset. From Equation (9) and Equation (10) the range of the technology category is provided that can be applied to the graph G, as in Equation (11):

$$\frac{m}{(m - \delta(G))} \geq \chi(G) \leq 1 + \Delta(G) \quad \text{Equation (11)}$$

The methods, systems and computer program products can make G sacrosanct, and can derive the maximum number of technology category from Equation (11), so the framework can restrict the represented current state from being diluted with high number of categories.

Figure 5:
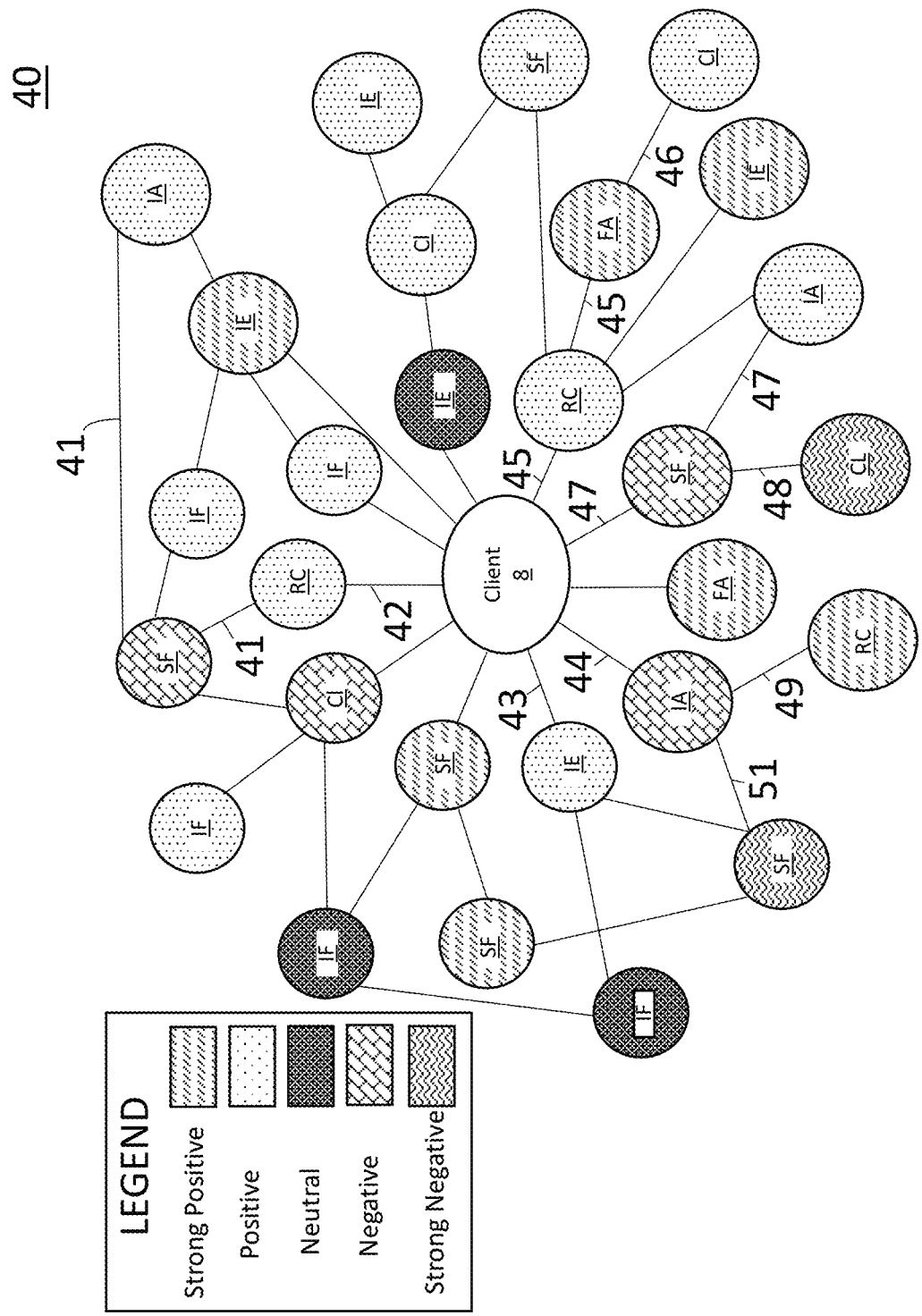
FIG. 5 is a graphical representation of a meta model illustrating use of coloring (depicted as crosshatching) for illustrating strengths and weakness for relevant content, in accordance with one embodiment of the present disclosure.

FIG. 5 illustrates one embodiment of coloring methodology 42 used in the graphs. In some embodiments, a proper coloring of a graph induces a partitioning of the vertices into different subsets. In FIG. 5 different colors are represented by different types of cross hatching. No two vertices in any of these subsets are adjacent, such a subset of vertices is called an independent set denoted by $\beta(G)$. We can thus use coloring as the taxonomy parallel for classification of the technology. For the graph G depicted in FIG. 4, the largest number of vertices having the same color cannot exceed $\beta(G)$. This is expressed in Equation (12):

$$k \cdot \beta(G) \geq n \Rightarrow \beta(G) \geq \frac{n}{k} \qquad \text{Equation (12)}$$

Equation (13), gives maximum number of vertices in the largest independent set for a technology category. From Equations (12) and (13), the prevalent technology category in the reference documents can be determined. The minimum edge covering $EC_{min}$ is a set 'g' of edges if every vertex in G is incident on at least one edge in g and if no proper subset of g is an edge covering of G. Equation (13) is as follows:

$$EC_{min} = \frac{n+1}{2} \qquad \text{Equation (13)}$$

Minimum vertex covering $VC_{min}$ is a set of vertices such that each edge of the graph is incident to at least one vertex of the set n. This can be solved by vertex cover algorithm, Framework by now has 'n' number of reference technologies in its library being represented in G. Equation (14) is as follows:

$$EVC_{min} = n - \left(\frac{n}{\Delta(n)+1}\right) \qquad \text{Equation (14)}$$

G can take this as the pivotal reference technology and collect other related independent sets for the sub-componentization or further classification. The maximum reach of the research is given by the $EC_{min}$ computation.

FIG. 5 is a graphical representation of a meta model illustrating use of coloring (depicted as crosshatching) for illustrating the application of traversal logic. In some embodiments of the present disclosure, this step of the method may be provided by the logic engine 204 for the system for cognitive analysis for enterprise decisions using a meta model 200 that is depicted in FIG. 2. In some embodiments, building traversal logic may include using a technology curator algorithm to traverse through the reference technologies and find the most relevant ones for the given technology trend. This simple algorithm will provide the relevant vertices to the Framework as per the technology trend priority that has been established by the Framework.

The relevant data has been pulled by the framework and has been further sectioned into various technology trends. To adopt the technology to the mapping structure, the framework employs a section-technology trend-k mapping such that the combination of $K_n$ is unique for each technology trend. FIG. 7 includes a table of the section technology trend-k mapping.

Figure 6:
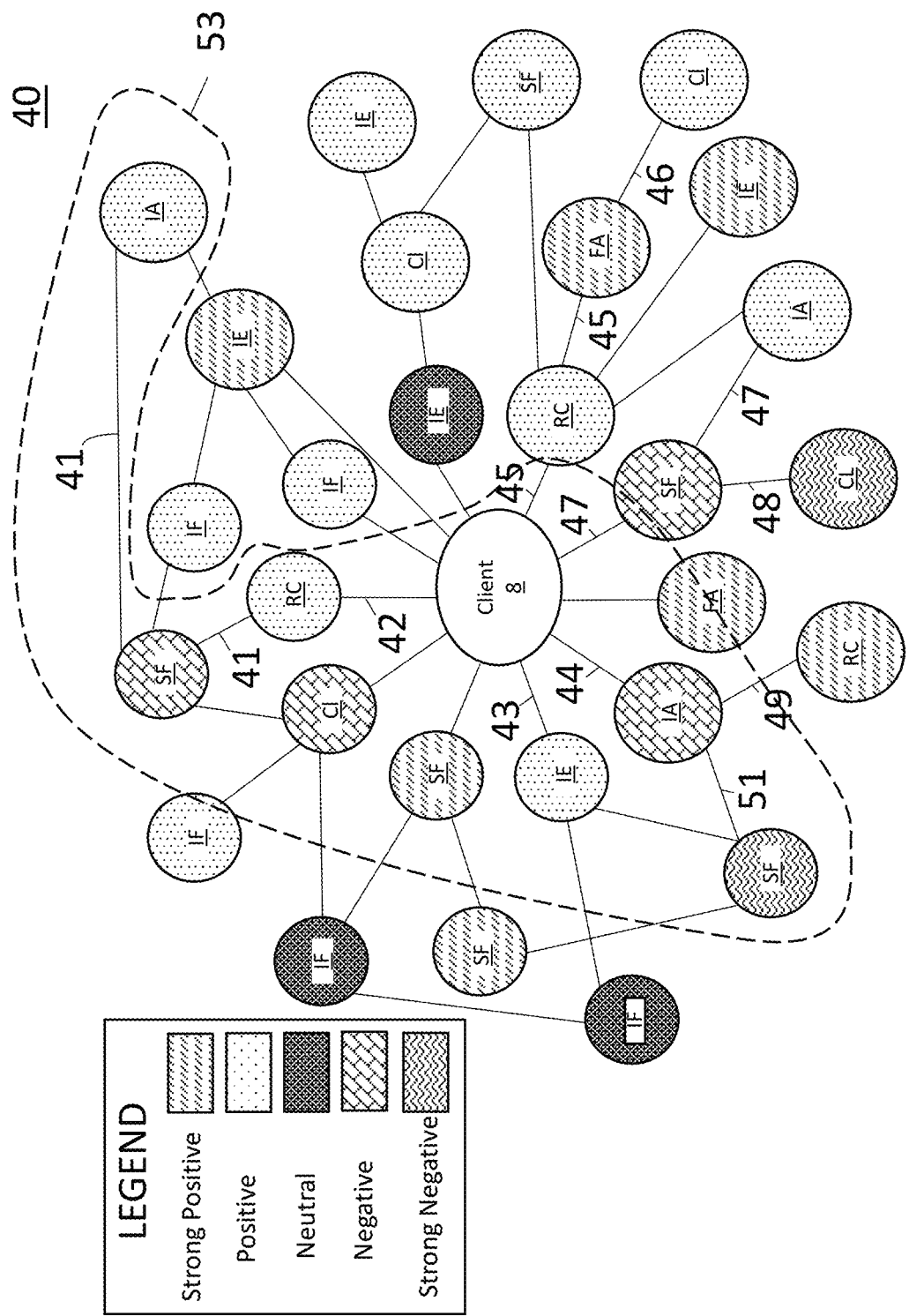
FIG. 6 is a graphical representation of a meta model for illustrating the application of traversal logic, in accordance with one embodiment of the present disclosure.

In some embodiments, a technology curator algorithm Al(1) is used to traverse through the reference technologies to find the most relevant ones for the given technology trend. FIG. 6 illustrates one example of traversal logic being applied to a meta model 40 to identify the most relevant reference technologies 53 for a given technology trend relative to the client 8. This algorithm can provide the relevant vertices to the Framework as per the technology trend priority that has been established by the Framework. One example of a technology curator algorithm is as follows:

Al(1): Functionality context consist of identifying Functionality current stated on multiple Technology Trends, which includes the following sequence:
1. Start with Technology trend 1;
2. Create a fusion of the sub-graphs for which Km has been set positive;
3. Find the degree priority of the vertex in the new sub-graph;
4. Choose the highest degree vertex. The minimum recommended height is 5.
5. Store the vertex as a new node in Reference technology Graph ($A_{di}$);
6. Find the next highest vertex which is closest to this vertex;
7. Continue till the vertex degree >k;
8. Move to next Technology trend; and
9. Stop when the Technology trends are completed.

With this traversal, the partitions created are sub graphs with min cut achieved (at least 5) and allows for a heat map corresponding to the component business model (CBM).

In some embodiments of the present disclosure, this step of the method may be provided by the logic engine 204 for the system for cognitive enterprise meta modeling 200 that is depicted in FIG. 2.

The method may continue with associating Industry CBM (or Enterprise Capability Model (ECM) and identify hot components based on business goal (e.g. revenue generation or cost saving). FIG. 8 is a table illustrating the elements of a component business model (CBM) 57. The elements of the component business model (CBM) 57 may include sales and service 58a, customer offer development 58b, product specific design and processing 58c, cross product design and processing 58d, business support 58e, data management 58f and risk and compliance management 58g.

Figure 9:
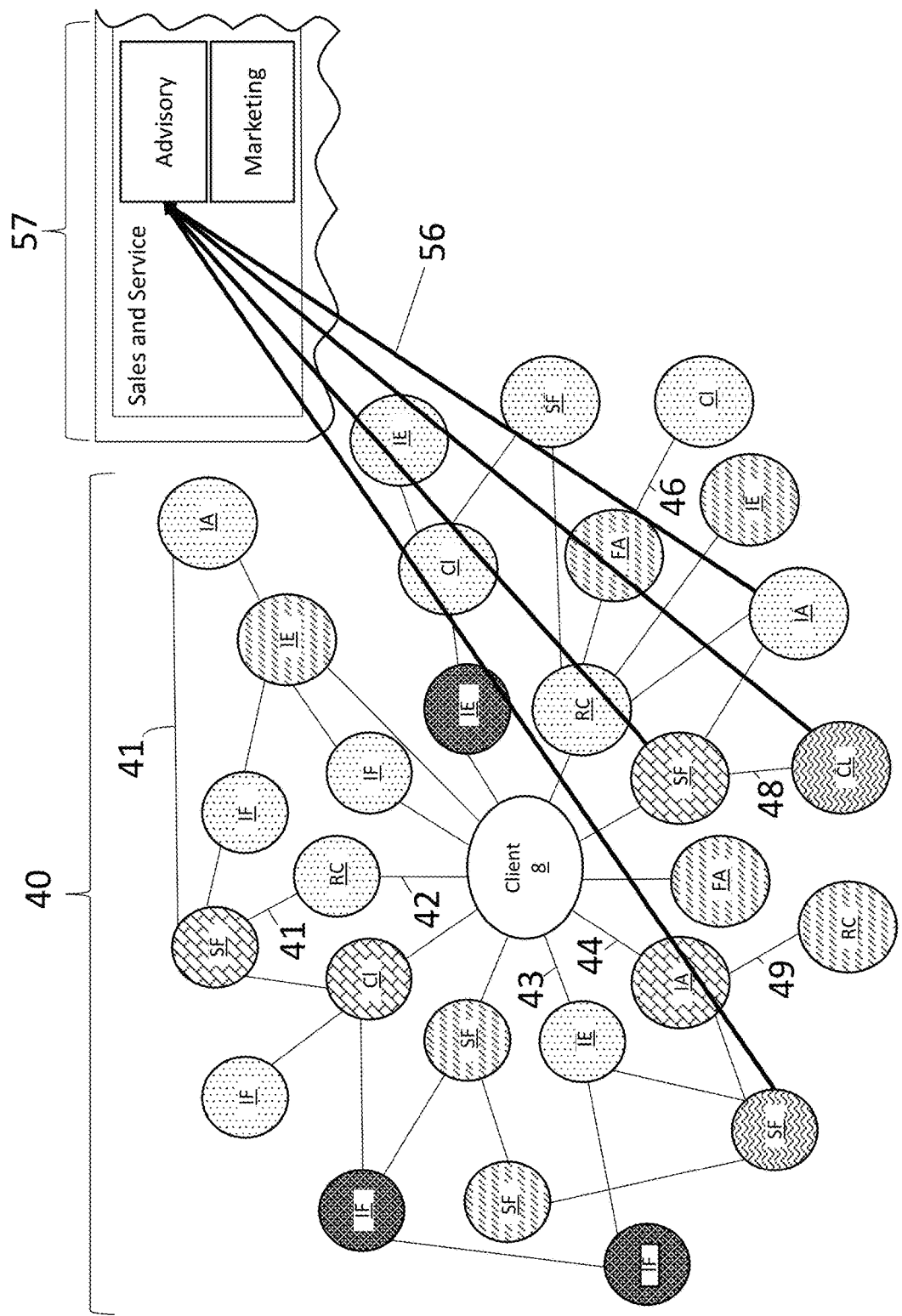
FIG. 9 is an illustration depicting extracting learning within an industry force federated model and transfer learnings across all assessments.

In some embodiments of the present disclosure, this step of the method may be provided by the component business model evaluator 205 for the system for cognitive enterprise meta modeling 200 that is depicted in FIG. 2. Take every hot CBM component and create linkage 56 of its level 3 capabilities and processes to Industry force findings, as depicted in FIG. 9. It provides intelligent automated model to perform Industry force heatmap on Industry CBM/ECM. The linkage 56 may be stored (and be accessible) in an element of the component business model, such as a portion titled advisory in sales and service 58a component of the component business model 57. The linkage 56 can help a practitioner to identify, in an objective, consistent, and repeatable way, the components within an Enterprise Component Model (ECM) that should be matured to help achieve a client's top Business Aims and Goals and, once identified, to create a roadmap that defines the order in which the components should be matured and leverage past engagements by transferring the learning into the core model. In some embodiments of the present disclosure, this step of the method may be provided by the linkage generator 206 for the system for cognitive analysis for enterprise decisions using a meta model 200 that is depicted in FIG. 2.

Referring to FIG. 1, in some embodiments, the method may continue with extracting learnings within an industry force federated model and transfer learnings across all assessments.

In some embodiments, the methods, systems and computer program products provide for evolution over time. For example, the time period for a cycle of the method may be by every quarter of a year. The evaluation over time may be determine the effects of a changing market, which enables a cognitive enterprise to be agile and react quickly to changing market needs.

FIG. 2 is a block diagram illustrating a system for cognitive enterprise meta model 200. The system for cognitive analysis for enterprise decisions using a meta model 200 may be used in combination with the method described in FIG. 1. The system 200 includes a modeler 201 for creating an industry force graph meta model for a client; and a maturity calculator 202 establishing a relationship for each maturity dimension to determine most relevant content. The system 200 further includes an industry trend evaluator 203 for graphing most relevant content using a chromatic polynomial to map strongest industry trends in an industry force; and a logic engine 204 for building traversal logic to determine most relevant technologies for the strongest industry trends in the industry force. The system 200 may further include a component business model evaluator 205 for identifying most relevant components of an component business model; and a linkage generator 206 for creating linkages between the strongest industry trends in the industry force to the most relevant components of the component business model.

The linkages 56 provide data on client performance in an industry force.

Figure 10:
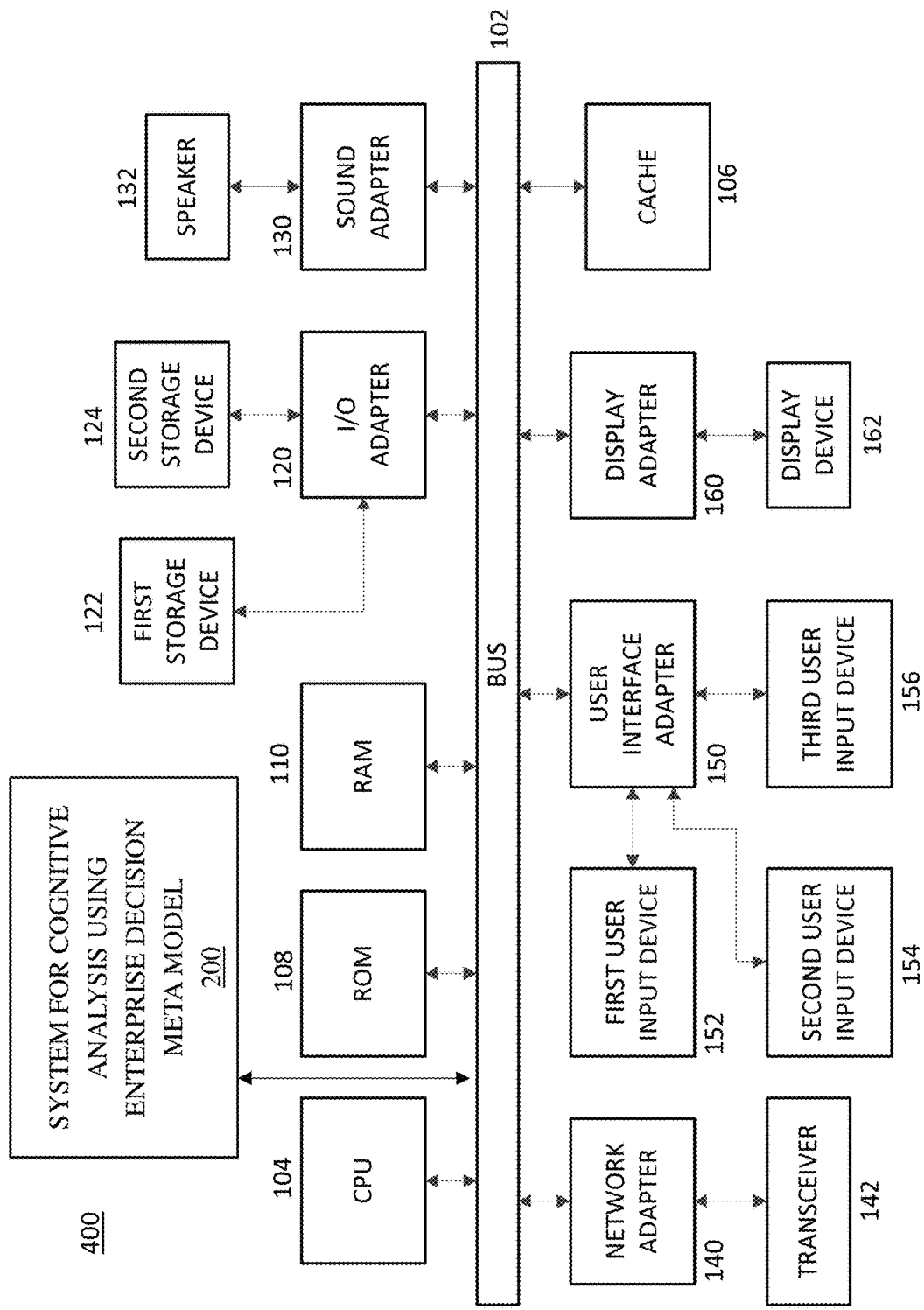
FIG. 10 is a block diagram illustrating a system that can incorporate the system for cognitive analysis for enterprise decisions using a meta model that is depicted in FIG. 2, in accordance with one embodiment of the present disclosure.

The system for cognitive enterprise meta model analysis 200 may be integrated into the processing system 400 depicted in FIG. 10. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product comprising a non-transitory computer readable storage medium having computer readable program code embodied therein for providing enterprise decision making from a meta model. In some embodiments, the computer program product for providing enterprise decision making from a meta model includes a computer readable storage medium having computer readable program code embodied therewith, the program instructions executable by a processor to cause the processor to create, using the processor, an industry force graph meta model for a client. The computer program product can further establish, using the processor, a relationship for each maturity dimension to determine most relevant content; and graph, using the processor, most relevant content using a chromatic polynomial to map strongest industry trends in an industry force. The computer program product further builds, using the processor, traversal logic to determine most relevant technologies for the strongest industry trends in the industry force; and identifies, using the processor, most relevant components of an component business model. Additionally, the computer program product can create, using the processor, linkages between the strongest industry trends in the industry force to the most relevant components of the component business model, wherein the linkages provide data on client performance in an industry force.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 11:
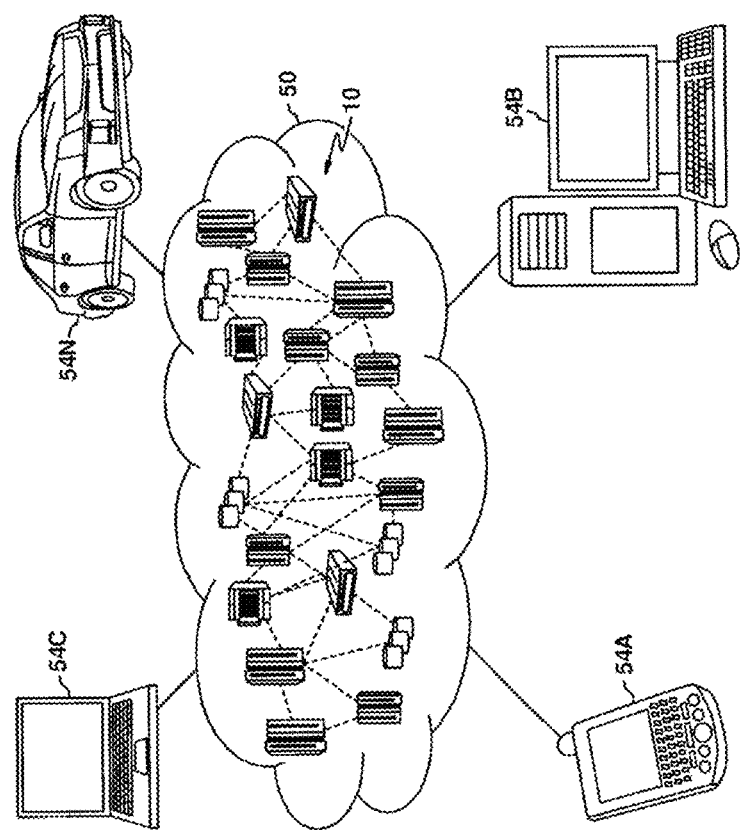
FIG. 11 depicts a cloud computing environment according to an embodiment of the present disclosure.

Referring now to FIG. 11, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 51 and cloud computing environment 50 can communicate with any type of computerized device over any type of network and/or network addressable connection (e.g., using a web browser).

Figure 12:
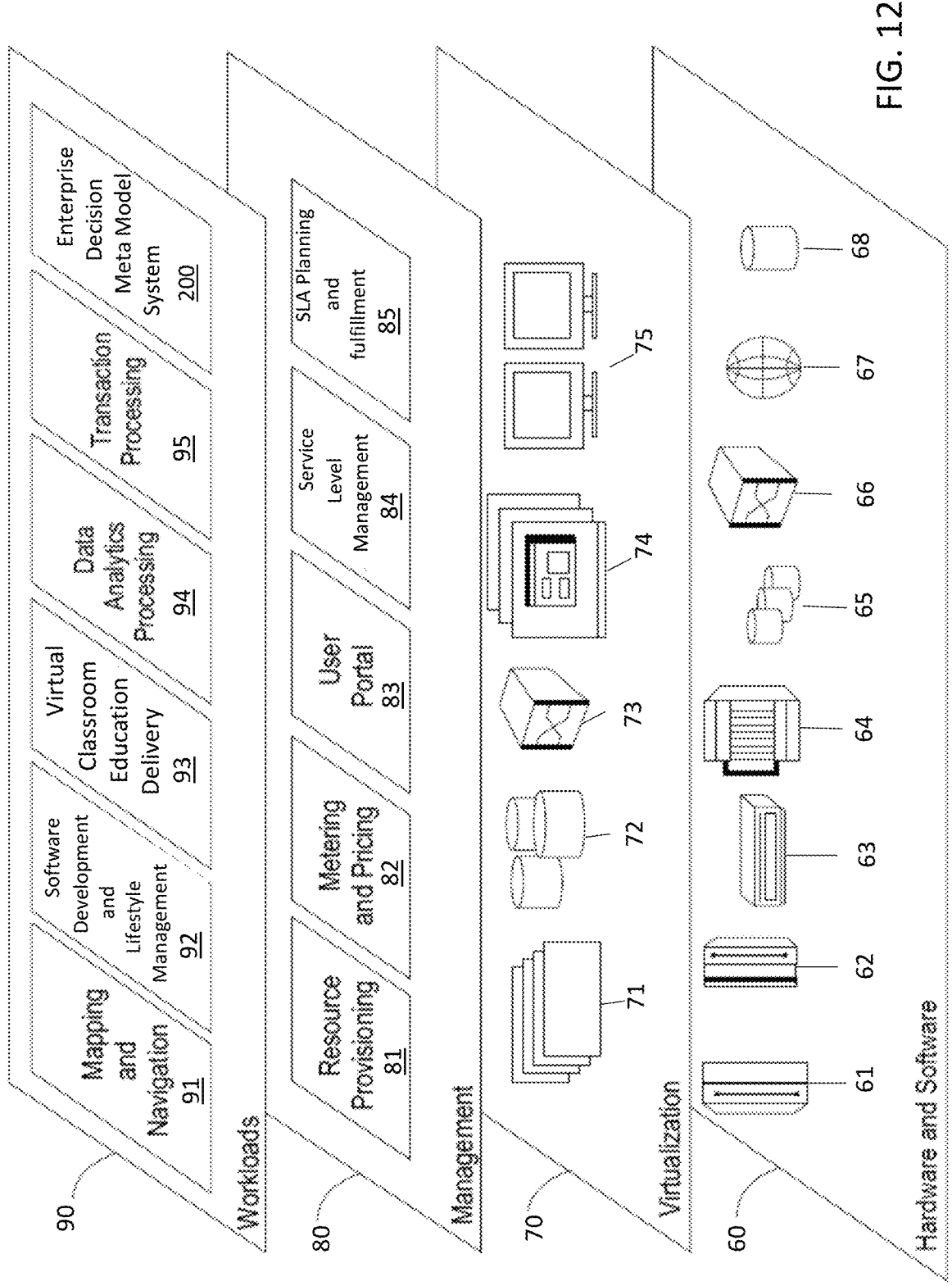
FIG. 12 depicts abstraction model layers according to an embodiment of the present disclosure.

Referring now to FIG. 12, a set of functional abstraction layers provided by cloud computing environment 50 (FIG. 1) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for cognitive analysis for enterprise decision meta model 200, which is described with reference to FIGS. 1-10.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of cognitive analysis for enterprise decision meta model, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for decision making from a meta model comprising:
creating an industry force graph meta model, wherein creating the industry force graph meta model comprises establishing graph min-cut, wherein the graph min-cut is the maximum number of connections a sign code can have identifying the maximum linkages a technology can have;
establishing a relationship for each maturity dimension to determine most relevant content from the industry force graph meta model;
graphing the most relevant content using a chromatic polynomial to map strongest industry trends in an industry force;
building traversal logic to determine most relevant technologies for the strongest industry trends in the industry force;
identifying most relevant components of a component business model for the client;
creating linkages between the strongest industry trends in the industry force to the most relevant components of the component business model, wherein the linkages provide data on client component performance in an industry force directed to maturity of the most relevant components of the business model; and
modifying through automation a client business using most relevant components of the component business model, the most relevant components being selected from cloud integration and block chain memory.

2. The computer-implemented method of claim 1, wherein the industry force is digital banking.

3. The computer-implemented method of claim 1 further comprising modifying enterprise business components with a roadmap that defines the order in which the components should be matured.

4. The computer-implemented method of claim 1, wherein creating the industry force graph meta model includes technology reflecting on a clients current state.

5. The computer-implemented method of claim 4, wherein said technology is selected from the group consisting of research technology, technology forums, social media, functionalities internal form, financial analysist technology, technology events, and combinations thereof.

6. The computer-implemented method of claim 1, wherein the data on client component performance includes a roadmap that defines the order in which the components should be matured.

7. A system for providing enterprise decision making from a meta model comprising:
a modeler for creating an industry force graph meta model for a client, wherein creating the industry force graph meta model comprises establishing graph min-cut, wherein the graph min-cut is the maximum number of connections a sign code can have identifying the maximum linkages a technology can have;
a maturity calculator establishing a relationship for each maturity dimension to determine most relevant content from the industry force graph metal model;
an industry trend evaluator for graphing most relevant content using a chromatic polynomial to map strongest industry trends in an industry force;
a logic engine for building traversal logic to determine most relevant technologies for the strongest industry trends in the industry force;
a component business model evaluator for identifying most relevant components of an component business model;
a linkage generator including a set of instructions stored on memory to be executed by a processor for creating linkages between the strongest industry trends in the industry force to the most relevant components of the component business model, wherein the linkages provide data on client component performance in an industry force directed to maturity of the most relevant components of the business model; and modifying through automation a client business using most relevant components of the component business model, the most relevant components being selected from cloud integration and block chain memory.

8. The system of claim 7, wherein the industry force is digital banking.

9. The system of claim 7, wherein creating the industry force graph meta model includes technology reflecting on a clients current state.

10. The system of claim 9, wherein said technology is selected from the group consisting of research technology, technology forums, social media, functionalities internal form, financial analyst technology, technology events, and combinations thereof.

11. The system of claim 7, wherein the most relevant components of the component business model comprises a business goal for the client.

12. The system of claim 7, wherein the data on client component performance includes a roadmap that defines the order in which the components should be matured.

13. A computer program product for providing enterprise decision making from a meta model comprising a computer readable storage medium having computer readable program code embodied therewith, the program instructions executable by a processor to cause the processor to:

create, using the processor, an industry force graph meta model for a client, wherein creating the industry force graph meta model comprises establishing graph min-cut, wherein the graph min-cut is the maximum number of connections a sign code can have identifying the maximum linkages a technology can have;

establish, using the processor, a relationship for each maturity dimension to determine most relevant content from the industry force graph metal model;

graph, using the processor, most relevant content using a chromatic polynomial to map strongest industry trends in an industry force;

build, using the processor, traversal logic to determine most relevant technologies for the strongest industry trends in the industry force;

identify, using the processor, most relevant components of an component business model;

create, using the processor, linkages between the strongest industry trends in the industry force to the most relevant components of the component business model, wherein the linkages provide data on client component performance in an industry force directed to maturity of the most relevant components of the business model; and modifying through automation a client business using most relevant components of the component business model, the most relevant components being selected from cloud integration and block chain memory.

14. The computer program product of claim 13, wherein the industry force is digital banking.

15. The computer program product of claim 13, wherein creating the industry force graph meta model includes technology reflecting on a clients current state.

16. The computer program product of claim 15, wherein said technology is selected from the group consisting of research technology, technology forums, social media, functionalities internal form, financial analyst technology, technology events, and combinations thereof.

17. The computer program product of claim 13, wherein the most relevant components of the component business model comprises a business goal for the client.

* * * * *